Patented Sept. 2, 1952

2,609,369

UNITED STATES PATENT OFFICE 2,609,369

METHOD OF PURIFYING STREPTOMYCIN

Walter A. Winsten, Forest Hills, N. Y., assignor to Schenley Industries, Inc., a corporation of Delaware No Drawing. Application October 2, 1948, Serial No. 52,590

9 Claims. (Cl. 260—210)

My invention relates to a new and improved method of purifying streptomycin and a new and improved streptomycin preparation.

The production, concentration, and purification of streptomycin are well known, and disclosed, for example, at pages 1335–1336 of the 24th edition (1947) of "The Dispensatory of the United States of America."

As stated in this publication, streptomycin must be purified so that it contains no histamine or histamine-like substances, which act to depress blood pressure. Such histamine-like substances are usually produced during the production of streptomycin by *Streptomyces griseus*.

The standard test for such elimination of histamine and histamine-like substances, is to narcotize a subject cat with sodium pentobarbital, and to inject the streptomycin or a complex thereof into the cat, at a level of 3000 units per kilogram of the body weight of the subject. Such unit is the antibiotic activity of one microgram of the base of streptomycin. A streptomycin preparation is considered suitable for injection into human subjects if its content of histamine-like substances has been so reduced that the injection at said level produces a lowering of blood pressure in the subject cat, which is equal to or less than the lowering of blood pressure which is produced by 0.1 microgram of histamine per kilogram of the body weight of the subject cat.

I have discovered that I can reduce the concentration of histamine or histamine-like substances in streptomycin preparations, to and below said test level, by reacting a solution of impure streptomycin, preferably an aqueous solution, with bromine, preferably at a pH below 7. The reaction may be conducted at ordinary room temperature of 20° C.–25° C., and at standard atmospheric pressure of 760 mm. of mercury. The recovery of streptomycin from the reaction is high, and such recovery is substantially 90%–100% (by weight) of the streptomycin in the impure starting material.

I do not limit the invention to any specific theory of reaction. During the reaction period, which ordinarily is 15 minutes, there is a substantial drop in pH of the reaction mixture. I believe that this results from oxidation of the histamine or histamine-like substances, with the resultant formation of hydrobromic acid. However, the reaction may result in bromination of the histamine or histamine-like impurity.

As a starting material, I prefer to use an aqueous solution of impure streptomycin which has a pH below 7, as 5.7. This is not necessary when bromine is used, because the reaction with bromine quickly lowers the initial pH, which may be 7, to a value below 7. I prefer to maintain a pH below 7 in the reaction solution during the entire period of the reaction, or commencing very shortly after the beginning of the reaction period.

Further objects and features and alternatives of my invention are disclosed in the following description, which discloses illustrative examples, to which the invention is not limited.

Starting material No. 1

When streptomycin is produced by a fermentation of a suitable medium with *S. griseus*, the histamine-like substance is also present in the final resultant crude fermentation broth. In obtaining streptomycin from such a broth, substantially free of histamine-like impurities, I find it convenient to prepare a concentrate of streptomycin by a sequence of well known steps which do not however by themselves serve to free streptomycin from histamine-like impurities. After producing such a streptomycin concentrate, I then treat it according to my invention in order to remove and/or destroy the histamine-like impurity without affecting or destroying to any substantial degree the streptomycin itself.

There are various well known methods of concentrating the original impure or crude culture broth.

As one example, the streptomycin can be adsorbed on silica gel from the original crude broth. Such gel is separated and washed with water which has been acidified with hydrochloric acid or other suitable acid, thus eluting the adsorbed streptomycin as a hydrochloride salt, if hydrochloric acid is used. The resultant elution liquid is neutralized. The streptomycin is adsorbed on activated carbon from the neutral elution liquid, and this activated carbon is separated by centrifugation or filtration. The streptomycin is eluted from the activated carbon with aqueous acetone which is acidified with hydrochloric acid or other suitable acid. The elution liquid is neutralized and then concentrated by any conventional method, to give a preparation containing 68,000 units per ml. of streptomycin.

The resultant neutral concentrate may be used as one of the reactants, or said neutral concentrate may be acidified prior to the reaction, as to a pH of 5.7. If it is desired to acidify said neutral concentrate prior to the reaction, it may be acidified with hydrochloric acid.

Starting material No. 2

As an alternative, I can adsorb the streptomycin from the original crude fermentation broth by silica gel, elute the separated gel with acidified water, neutralize the elution liquid, and concentrate the elution liquid to substantially 1,000–10,000 units per cubic centimeter. This starting material may be acidified prior to using it as one of the reactants.

*Bromine reactant No. 1*

This is bromine water, of the kind which is used as a bromine test solution. It contains 2 cc. of bromine, dissolved in 100 cc. of distilled water.

*Bromine reactant No. 2*

This is a solution of bromine in chloroform or other organic solvent.

*Example No. 1*

The reactants are starting material No. 1, and said bromine water, in the proportion of 5 cc. of starting material No. 1 (68,000 units per ml. of streptomycin) to 15 cc. of said bromine water. As above noted, said starting material No. 1 may be neutral, or it may have a pH below 7, such as a pH of 5.7, when it is used as a reactant.

These reactants are intermixed and reacted for 15 minutes at normal room temperature of 20° C.–25° C., at said normal atmospheric pressure. The mixture is optionally continuously mechanically agitated during this reaction period of 15 minutes.

During the reaction, if the initial pH of starting material No. 1 is 5.7, the pH of the reaction mass or mixture drops to 2.1.

The reaction mass is then neutralized by means of sodium hydroxide.

When thus neutralized, a transient purple color is often observed. This color soon becomes a dull color.

Excess free bromine is then removed from the neutral aqueous solution of the purified streptomycin, by extraction with chloroform, in the proportion of 20 cc. of chloroform per 15 cc. of bromine water. This is done at normal room temperature and at normal pressure. The solution of the bromine in the chloroform is separated from the aqueous streptomycin solution by usual means, at normal room temperature and at normal pressure.

Any traces of chloroform in the aqueous streptomycin solution are removed by evaporation at reduced pressure of 20 mm. of mercury, at 50° C. or less.

The aqueous solution of streptomycin is then allowed to stand at 5° C. during a settling period of 24 hours. Sediment settles out and this is separated from the neutral aqueous solution of purified streptomycin.

Streptomycin, which has been thus treated, passes the above-mentioned test for histamine-like substances, and it may be used for injection purposes, for making complexes, etc.

Tests have shown that from 93%–100% by weight of the streptomycin in the original impure starting material remains undecomposed in the aqueous solution of the purified streptomycin, by following this example.

*Example No. 2*

The starting material No. 1 is continuously mechanically agitated with a solution of bromine in chloroform, using the above-mentioned proportions of said starting material No. 1 and bromine in Example No. 1. The reaction period and temperature are the same as in Example No. 1.

The chloroform and the unreacted bromine which are dissolved therein, are removed, and traces of chloroform in the aqueous solution of the purified streptomycin are removed as in Example No. 1, and the setting step of Example No. 1 is used, with removal of resultant sediment.

*Example No. 3*

Starting material No. 2 is used. Otherwise, the procedure is the same as in Examples No. 1 or No. 2.

The streptomycin is then adsorbed from the neutral aqueous solution of purified streptomycin on activated carbon. This activated carbon is separated and eluted with acidified aqueous acetone, and the elution liquid may be neutralized as the end-product, which may be concentrated or otherwise treated. This produces a purer end-product. Also, various impurities, such as inorganic bromides and brominated impurities, are not adsorbed on the activated carbon.

It is thus advantageous to use the activated carbon as an adsorption agent, after the reaction with the bromine.

As above noted, the starting material may be an aqueous solution of streptomycin of any concentration and purity.

Bromine has an extremely advantageous and selective action for the purposes of my invention.

Iodine does not react with the histamine-like substances.

Sodium hypochlorite, NaOCl, is no more effective than bromine, and it results in a greater loss of streptomycin.

When sodium hypochlorite is used, the starting material is preferably acidified, as with hypochloric acid, thus forming hypochlorous acid in the reaction mixture. The oxidizing action of sodium hypochlorite in aqueous solution, especially in acidified aqueous solution, is well known.

I have described preferred embodiments of my invention, but numerous changes and omissions and additions can be made without departing from its scope.

I claim:

1. Process for reducing the histaminic activity of histamine and histamine-like impurities in an aqueous streptomycin-containing solution that comprises treating said solution with an excess of a solution of bromine under non-alkaline conditions at a temperature approximating ordinary room temperature and atmospheric pressure, for a period of about 15 minutes, adjusting the hydrogen ion concentration of the mixture to a pH approximating 7, and removing the excess bromine present.

2. Process as defined in claim 1 wherein the solution of bromine used is an aqueous solution of elemental bromine.

3. Process as defined in claim 1 wherein the solution of bromine used is an aqueous solution of elemental bromine, containing about 2 cc. of elemental bromine per 100 cc. of water.

4. Process as defined in claim 1 wherein the solution of bromine is one in which the solvent is an organic liquid.

5. Process as defined in claim 1 wherein the solution of bromine is one in which the solvent is chloroform.

6. Process as defined in claim 1 wherein the excess of bromine present is removed by extraction with a water-immiscible organic solvent capable of dissolving bromine.

7. Process as defined in claim 1 wherein the excess of bromine present is removed by extraction with chloroform.

8. Process as defined in claim 1 further characterized in that the streptomycin content of the final neutralized solution is recovered from the solution by adsorption on activated charcoal, followed by elution with an acidic organic solvent.

9. Process as defined in claim 1 further characterized in that the streptomycin content of the final neutralized solution is recovered from the solution by adsorption on activated charcoal, followed by elution with an acidic aqueous acetone mixture.

WALTER A. WINSTEN.

REFERENCES CITED

The following references are of record in the file of this patent:

Fried et al., JACS, v. 69 (1947), pp. 79-86, 8 pages.

Van Dolah et al., Arch. Biochem., v. 12 (1947), pp. 7-12, 6 pages.